(12) United States Patent
He et al.

(10) Patent No.: US 11,797,850 B2
(45) Date of Patent: Oct. 24, 2023

(54) WEIGHT PRECISION CONFIGURATION METHOD AND APPARATUS, COMPUTER DEVICE AND STORAGE MEDIUM

(71) Applicant: LYNXI TECHNOLOGIES CO., LTD., Beijing (CN)

(72) Inventors: Wei He, Beijing (CN); Yaolong Zhu, Beijing (CN); Han Li, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 18/015,065

(22) PCT Filed: Jul. 8, 2021

(86) PCT No.: PCT/CN2021/105172
§ 371 (c)(1),
(2) Date: Jan. 8, 2023

(87) PCT Pub. No.: WO2022/007879
PCT Pub. Date: Jan. 13, 2022

(65) Prior Publication Data
US 2023/0196103 A1   Jun. 22, 2023

(30) Foreign Application Priority Data

Jul. 9, 2020   (CN) .......................... 202010657996.9
Jul. 9, 2020   (CN) .......................... 202010659069.0
(Continued)

(51) Int. Cl.
*G06N 3/08* (2023.01)
(52) U.S. Cl.
CPC .................................... *G06N 3/08* (2013.01)
(58) Field of Classification Search
CPC .................................................... G06N 3/08
See application file for complete search history.

(56) References Cited

U.S. PATENT DOCUMENTS 6,269,351 B1   7/2001  Black
10,229,356 B1 *  3/2019  Liu .......................... G10L 15/16
(Continued)

FOREIGN PATENT DOCUMENTS

CN   107102727 A   8/2017
CN   108009625 A   5/2018
(Continued)

OTHER PUBLICATIONS

WIPO, International Search Report dated Oct. 9, 2021.
(Continued)

*Primary Examiner* — Ann J Lo
*Assistant Examiner* — Van C Mang
(74) *Attorney, Agent, or Firm* — Li & Cai Intellectual Property (USA) Office

(57) ABSTRACT

An embodiment of the present disclosure provides a weight precision configuration method, including: determining a pre-trained preset neural network including a plurality of layers each having a preset weight precision; reducing, based on a current threshold, the weight precision of at least one layer in the preset neural network to obtain a corrected neural network having a recognition rate greater than the current threshold; and reducing the weight precision of a layer includes: adjusting the weight precision of the layer; setting, if a termination condition is met, the weight precision of the layer to a corrected weight precision that is less than or equal to the preset weight precision of the layer; and returning, if the termination condition is not met, to the operation of adjusting the weight precision of the layer; and determining a final weight precision of each layer to obtain a final neural network.

18 Claims, 8 Drawing Sheets

(30) Foreign Application Priority Data

Jul. 10, 2020 (CN) .......................... 202010663771.4
Jul. 10, 2020 (CN) .......................... 202010664837.1

(56) References Cited

U.S. PATENT DOCUMENTS

| | | | |
|---|---|---|---|
| 2016/0174902 A1* | 6/2016 | Georgescu | G06V 10/454 600/408 |
| 2018/0096249 A1* | 4/2018 | Kim | G06N 3/045 |
| 2018/0322391 A1 | 11/2018 | Wu et al. | |
| 2019/0050710 A1 | 2/2019 | Wang et al. | |
| 2020/0042856 A1 | 2/2020 | Datta et al. | |
| 2020/0320344 A1* | 10/2020 | Ma | G06N 5/04 |
| 2020/0394523 A1* | 12/2020 | Liu | G06N 3/063 |

FOREIGN PATENT DOCUMENTS

| | | |
|---|---|---|
| CN | 108229670 A | 6/2018 |
| CN | 108345939 A | 7/2018 |
| CN | 109740508 A | 5/2019 |
| CN | 109800877 A | 5/2019 |
| CN | 109993300 A | 7/2019 |
| CN | 110009100 A | 7/2019 |
| CN | 110073371 A | 7/2019 |
| CN | 110163368 A | 8/2019 |
| CN | 110738315 A | 1/2020 |
| CN | 110799994 A | 2/2020 |
| CN | 111339027 A | 6/2020 |
| CN | 111831355 A | 10/2020 |
| CN | 111831356 A | 10/2020 |
| CN | 111831358 A | 10/2020 |
| CN | 111831359 A | 10/2020 |
| WO | 2020092532 A1 | 5/2020 |

OTHER PUBLICATIONS

China Patent Office, First Office Action dated Apr. 18, 2022 for application No. CN202010657996.9.
China Patent Office, Second Office Action dated Dec. 2, 2022 for application No. CN202010657996.9.
China Patent Office, First Office Action dated Apr. 18, 2022 for application No. CN202010659069.0.
China Patent Office, Second Office Action dated Sep. 1, 2022 for application No. CN202010659069.0.
China Patent Office, First Office Action dated Aug. 15, 2022 for application No. CN202010663771.4.
China Patent Office, First Office Action dated Aug. 15, 2022 ffor application No. CN202010664837.1.

* cited by examiner

WEIGHT PRECISION CONFIGURATION METHOD AND APPARATUS, COMPUTER DEVICE AND STORAGE MEDIUM

CROSS-REFERENCE TO RELATED APPLICATIONS

The present application is a National Phase Application filed under 35 U.S.C. 371 as a national stage of PCT/CN2021/105172, filed on Jul. 8, 2021, an application claiming priority from Chinese Patent Application No. 202010657996.9, filed on Jul. 9, 2020 in the Chinese Intellectual Property Office, Chinese Patent Application No. 202010659069.0, filed on Jul. 9, 2020 in the Chinese Intellectual Property Office, Chinese Patent Application No. 202010663771.4, filed on Jul. 10, 2020 in the Chinese Intellectual Property Office, and Chinese Patent Application No. 202010664837.1, filed on Jul. 10, 2020 in the Chinese Intellectual Property Office, contents of which are hereby incorporated herein by reference in their entirety.

TECHNICAL FIELD

Embodiments of the present disclosure relate to the field of neural network technologies, and specifically relate to weight precision configuration method and apparatus, a computer device and a computer-readable storage medium.

BACKGROUND

A neural network based on a computer system includes a large number of neurons, and can handle problems in a human brain-like manner, such as performing image recognition, speech recognition, or natural language processing. Different neurons in the neural network are connected with each other, based on which the neural network is divided into a plurality of layers each including one or more neurons, where each neuron in a previous layer is connected to one or more neurons in a next layer, and can transmit data to the neurons in the next layer.

Each layer of neurons have weight data, such as a weight value for the connection between each neuron in this layer to a neuron in a previous layer (e.g., forming a weight matrix). Typically, all weight data in one layer (all weight values in one layer) have a same precision, that is, each layer of neurons have a unified weight precision. The specific precision types may include integer (Int), floating-point (FP), and the like, such as 8-bit integer (Int8), 16-bit floating-point (FP16), 32-bit floating-point (FP32), 64-bit floating-point (FP64).

Performance (such as the recognition rate) of the neural network varies with different weight precisions, and generally, a higher weight precision corresponds to better performance. However, the higher the weight precision, the greater the corresponding resource consumption, for example, more desired storage space, a greater computation volume, higher power consumption and so on.

SUMMARY

Embodiments of the present disclosure provide weight precision configuration method and apparatus, a computer device and a computer-readable storage medium.

In a first aspect, an embodiment of the present disclosure provides a weight precision configuration method, including: determining a pre-trained preset neural network, where the preset neural network includes a plurality of layers each having a preset weight precision, and the preset neural network has an initial recognition rate greater than a target threshold; reducing, based on a current threshold, the weight precision of at least one layer in the preset neural network to obtain a corrected neural network having a recognition rate greater than the current threshold, where the current threshold is less than or equal to the target threshold, and reducing the weight precision of a layer includes: adjusting the weight precision of the layer; setting, if a termination condition is met, the weight precision of the layer to a corrected weight precision that is less than or equal to the preset weight precision of the layer; and returning, if the termination condition is not met, to the operation of adjusting the weight precision of the layer; and determining, according to the corrected neural network, a final weight precision of each layer to obtain a final neural network, where the final neural network has a recognition rate greater than the target threshold.

In some embodiments, reducing the weight precision of at least one layer in the preset neural network includes: reducing weight precisions of multiple layers in the preset neural network.

In some embodiments, reducing weight precisions of multiple layers in the preset neural network includes: selecting a current target layer from candidate layers, where each candidate layer is an unlocked layer; adjusting the weight precision of the current target layer; setting, if the termination condition is met, the weight precision of the current target layer to the corrected weight precision, locking the current target layer and returning to the operation of selecting a current target layer from the candidate layers; and returning, if the termination condition is not met, to the operation of adjusting the weight precision of the current target layer.

In some embodiments, reducing weight precisions of multiple layers in the preset neural network includes: starting a round of adjustment; selecting a current target layer from candidate layers, where each candidate layer is an unlocked layer with a weight precision not adjusted in the current round of adjustment; adjusting the weight precision of the current target layer; setting, if the termination condition is met, the weight precision of the current target layer to the corrected weight precision, and locking the current target layer; returning, if there is still a candidate layer in the current round of adjustment, to the operation of selecting a current target layer from the candidate layers; and returning, if there is no candidate layer left in the current round of adjustment, to the operation of starting a round of adjustment.

In some embodiments, selecting the current target layer from the candidate layers includes: selecting a layer having the highest influence degree on the recognition rate of the neural network from the candidate layers as the current target layer; or selecting a layer having the lowest influence degree on the recognition rate of the neural network from the candidate layers as the current target layer.

In some embodiments, between determining the pre-trained preset neural network and reducing the weight precision of at least one layer in the preset neural network, the method further includes: determining the initial recognition rate of the preset neural network; respectively reducing, for each layer in the preset neural network, the weight precision of the layer by a same value from the preset weight precision of the layer, and determining a reduction value of a reduced recognition rate of the preset neural network from the initial recognition rate; determining, according to a relationship of the reduction values of the layers, a relationship of influence degrees of the layers on the recognition rate of the neural network, where the greater the reduction value of a layer, the higher the influence degree of the layer on the recognition rate of the neural network.

In some embodiments, selecting the current target layer from the candidate layers includes: selecting a layer with the largest number of weight values from the candidate layers as the current target layer; or selecting a layer with the smallest number of weight values from the candidate layers as the current target layer.

In some embodiments, reducing the weight precision of a layer includes: reducing the weight precision of the layer; returning, if a reduced recognition rate of the preset neural network is greater than the current threshold, to the operation of reducing the weight precision of the layer; and taking, if the reduced recognition rate of the preset neural network is less than or equal to the current threshold, the weight precision before the reduction as the corrected weight precision of the layer, and setting the weight precision of the layer to the corrected weight precision.

In some embodiments, reducing the weight precision of a layer includes: setting, if the weight precision of the layer is equal to the preset weight precision, the weight precision of the layer to a preset lowest precision; increasing the weight precision of the layer; returning, if an increased recognition rate of the preset neural network is less than or equal to the current threshold, the operation of increasing the weight precision of the layer; and taking, if the increased recognition rate of the preset neural network is greater than the current threshold, the increased weight precision as the corrected weight precision of the layer, and setting the weight precision of the layer to the corrected weight precision.

In some embodiments, returning, if the termination condition is not met, to the operation of adjusting the weight precision of the layer includes: training the preset neural network if the termination condition is not met, and returning to the operation of adjusting the weight precision of the layer.

In some embodiments, the current threshold is equal to the target threshold, and determining, according to the corrected neural network, the final weight precision of each layer includes: determining the weight precision of each layer in the corrected neural network as the final weight precision of the layer.

In some embodiments, the current threshold is less than the target threshold, and determining, according to the corrected neural network, the final weight precision of each layer includes: training the corrected neural network; and determining, according to a relationship between the recognition rate of the trained corrected neural network and the target threshold, the final weight precision of each layer.

In some embodiments, determining, according to the relationship between the recognition rate of the trained corrected neural network and the target threshold, the final weight precision of each layer includes: reducing the current threshold if the recognition rate of the trained corrected neural network is greater than the target threshold, and returning to the operation of reducing the weight precision of at least one layer in the preset neural network; and determining, if the recognition rate of the trained corrected neural network is less than or equal to the target threshold, the corrected weight precision of each layer in the corrected neural network after a previous training as the final weight precision of the layer.

In some embodiments, determining, according to the relationship between the recognition rate of the trained corrected neural network and the target threshold, the final weight precision of each layer includes: increasing the current threshold if the recognition rate of the trained corrected neural network is less than or equal to the target threshold, and returning to the operation of reducing the weight precision of at least one layer in the preset neural network; and determining, if the recognition rate of the trained corrected neural network is greater than the target threshold, the corrected weight precision of each layer in the trained corrected neural network as the final weight precision of the layer.

In some embodiments, training a neural network includes: acquiring the weight precision of a receiving layer in the neural network, where the receiving layer is a layer under a sending layer, and the sending layer is any layer except the last layer in the neural network; and configuring a precision of data to be output from the sending layer according to at least the weight precision of the receiving layer.

In a second aspect, an embodiment of the present disclosure provides a weight precision configuration apparatus, including: a preset module configured to determine a pretrained preset neural network, where the preset neural network includes a plurality of layers each having a preset weight precision, and the preset neural network has an initial recognition rate greater than a target threshold; a reduction module configured to reduce, based on a current threshold, the weight precision of at least one layer in the preset neural network to obtain a corrected neural network having a recognition rate greater than the current threshold, where the current threshold is less than or equal to the target threshold, and reducing the weight precision of a layer includes: adjusting the weight precision of the layer; setting, if a termination condition is met, the weight precision of the layer to a corrected weight precision that is less than or equal to the preset weight precision of the layer; and returning, if the termination condition is not met, to the operation of adjusting the weight precision of the layer; and a determination module configured to determine, according to the corrected neural network, a final weight precision of each layer to obtain a final neural network, where the final neural network has a recognition rate greater than the target threshold.

In a third aspect, an embodiment of the present disclosure provides a computer device, including at least one processing core configured to implement any method described above.

In some embodiments, the computer device includes a plurality of processing cores forming a many-core architecture.

In a fourth aspect, an embodiment of the present disclosure provides a computer-readable storage medium having a computer program stored thereon which, when executed by a processor, causes any method described above to be implemented.

In the embodiments of the present disclosure, the weight precision of each layer in a trained neural network (the preset neural network) with desired performance (the recognition rate greater than the target threshold) is adjusted so that the weight precision of each layer in the neural network is reduced as much as possible while ensuring the performance of the neural network (the recognition rate still greater than the target threshold). In other words, while ensuring that the training process of the neural network can be rapidly converged and takes a short time, and the recognition rate (accuracy rate) meets the requirements, it is also ensured that the neural network has a small scale, occupies small storage space, and involves a small computation

DETAIL DESCRIPTION OF EMBODIMENTS

Figure 1:
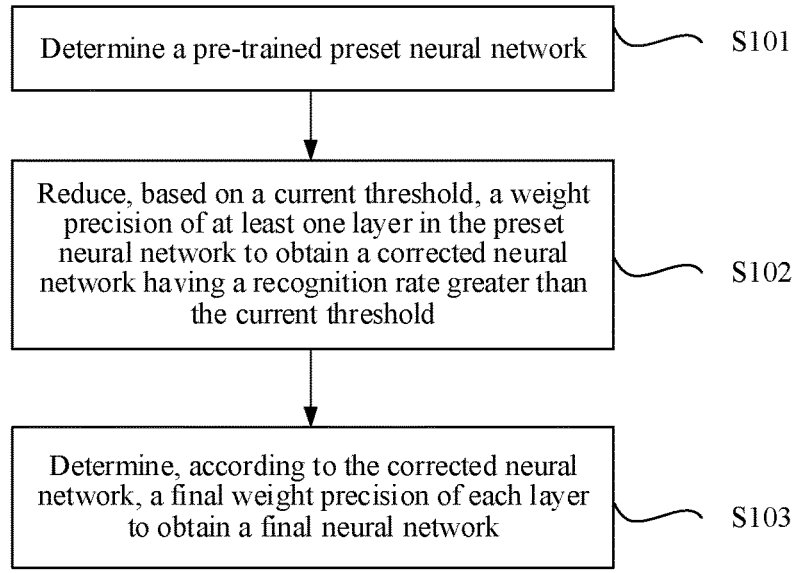
FIG. 1 is a flowchart of a weight precision configuration method according to an embodiment of the present disclosure.

The technical solution of the present disclosure is further explained below with specific implementations in combination with the attached drawings. It will be appreciated that the specific embodiments described herein are used merely for the purpose of explaining the present disclosure instead of limiting the present disclosure. It should be further noted that, for the convenience of description, merely some of the structures associated with the present disclosure, not all the structures, are shown in the drawings.

Before discussing the exemplary embodiments in greater detail, it should be noted that some exemplary embodiments are described as processes or methods depicted as flowcharts. Although a flowchart may describe the operations as a sequential process, many of the operations therein may be performed in parallel, concurrently, or simultaneously. In addition, the order of the operations may be rearranged. The process may be terminated when the operations are completed, but could have additional operations not included in the figure. The processes may correspond to methods, functions, procedures, subroutines, subprograms, and the like.

It should be noted that the terms "first", "second", and the like in the embodiments of the present disclosure are merely used for distinguishing different apparatuses, modules, units, or other objects, instead of limiting the order or interdependence of the functions implemented by these apparatuses, modules, units, or other objects.

In some existing technologies, an initial weight precision of each layer in a neural network may be preset before starting training (the weight precisions of different layers may be set to be the same or different), and during the training process, merely a specific weight value, instead of the weight precision, of each layer is changed to improve the recognition rate of the neural network.

However, it is difficult to balance the requirements of performance and resource consumption at the same time with the weight precision set as above. For example, if the set weight precision is too low, the training process is difficult to be converged and will take more time, while the resulted recognition rate (accuracy rate) is low, and the performance of the neural network is poor. In contrast, if the set weight precision is too higher, the neural network will have a large scale, occupy more storage space, and involve a large computation volume, high energy consumption and high resource consumption during operation.

In a first aspect, an embodiment of the present disclosure provides a weight precision configuration method.

The weight precision configuration method according to the embodiment of the present disclosure is used to configure a weight value precision, i.e., a weight precision, of each layer in the neural network.

The neural network in the embodiments of the present disclosure may include an artificial neural network (ANN), or may include a spiking neural network (SNN) or other types of neural networks (e.g., a convolutional neural network, or the like). The specific type of the neural network is not limited, which may be, for example, an acoustic model, a speech recognition model, an image recognition model, or the like, and may be applied to a data center, the security field, the smart healthcare field, the automatic driving field, the intelligent transportation field, the smart home field, or any other related field.

Referring to FIG. 1, the method according to the embodiment of the present disclosure includes the following operations S101 to S103.

At operation S101, determining a pre-trained preset neural network.

The preset neural network includes a plurality of layers each having a preset weight precision, and the preset neural network has an initial recognition rate greater than a target threshold.

The method according to the embodiment of the present disclosure is applied to a trained neural network with desired performance, namely the preset neural network. In the preset neural network, the weight precision of each layer is preset and defined before training (different layers may have the same weight precision or different weight precisions), and during the training process, merely the weight value, instead of the weight precision, is changed.

The recognition rate, also called accuracy rate, refers to a probability of obtaining a correct result when the neural network processes a specific problem, such as an accuracy rate of image recognition, an accuracy rate of speech recognition, and the like. Apparently, when different specific samples are processed, the specific accuracy rate achieved by the neural network may differ, and the recognition rate in the embodiments of the present disclosure refers to an average recognition rate that can be statistically achieved by the neural network for a large number of samples, that is, a recognition rate reflecting the "capability" of the neural network.

Before the weight precision is adjusted, the recognition rate of the preset neural network should be greater than a preset target threshold. In other words, it is desired that the recognition rate which is expected to be reached by the neural network after the weight precision adjustment should be reached before the adjustment. The value of the target threshold may be set according to specific situations.

It should be noted that the neural network having "a recognition rate greater than the target threshold" does not mean that the recognition rate of the neural network is equal to the target threshold. For example, if the actual recognition rate of the neural network is 0.95 (i.e., 95%), the recognition rate of the neural network should be considered to be greater than the target threshold when the target threshold is 0.94, 0.9, 0.85, or the like.

At operation S102, reducing, based on a current threshold, the weight precision of at least one layer in the preset neural network to obtain a corrected neural network having a recognition rate greater than the current threshold.

The current threshold is less than or equal to the target threshold, and reducing the weight precision of a layer includes: adjusting the weight precision of the layer; setting, if a termination condition is met, the weight precision of the layer to a corrected weight precision that is less than or equal to the preset weight precision of the layer; and returning, if the termination condition is not met, to the operation of adjusting the weight precision of the layer.

In this operation, taking the current threshold (which may be the same as the target threshold or less than the target threshold) as a standard, the weight precision of one or more layers of the preset neural network is tried to be reduced, while ensuring that the recognition rate of the corrected neural network obtained after the weight precision is reduced can still reach the current threshold.

Figure 2:
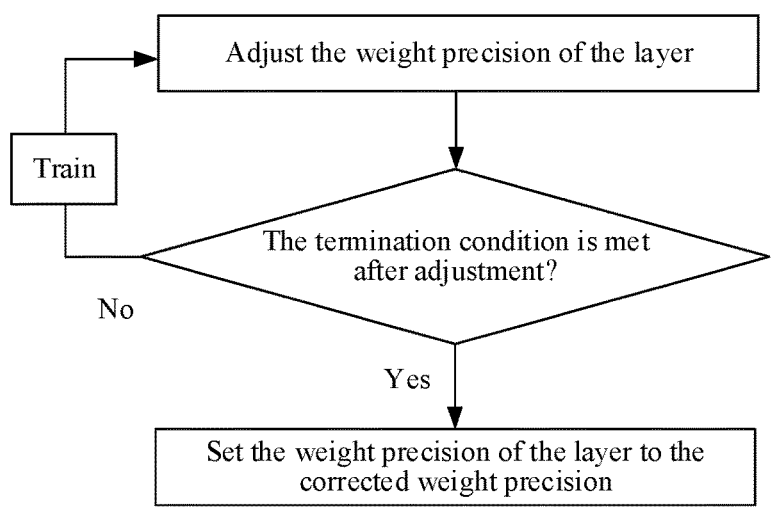
FIG. 2 is a schematic diagram illustrating a process of reducing the weight precision of one layer in a weight precision configuration method according to an embodiment of the present disclosure.

Referring to FIG. 2, reducing the weight precision of a layer includes: adjusting the weight precision of the layer, and determining whether the termination condition is met after the adjustment; returning, if the termination condition is not met (i.e., the adjustment of this layer is not finished), to the operation of adjusting the weight precision of the layer; and setting, if the termination condition is met (i.e., the adjustment of this layer is finished), the weight precision of the layer to the corrected weight precision, and finishing adjustment of the layer.

The above adjustment may include adjusting a level of the weight precision. For example, the weight precision is classified into different levels, including FP32, FP16, Int8, Int4, and the like, and each adjustment means selecting another level different from the current level. More specifically, each adjustment may include changing the weight precision by one level, such as from Int8 to FP16, or from Int8 to Int4.

The above termination condition is a condition for judging whether the weight precision adjustment of the layer is finished, and may differ depending on the specific adjustment mode. For example, when the adjustment is to gradually reduce the weight precision from the preset weight precision, the termination condition may be that the recognition rate of the adjusted preset neural network is less than or equal to the current threshold for the first time. When the adjustment is to gradually increase the weight precision from a very low weight precision (a preset lowest precision), the termination condition may be that the recognition rate of the adjusted preset neural network is greater than the current threshold for the first time.

Referring to FIG. 2, as a manner provided in an embodiment of the present disclosure, each time the weight precision of a layer is adjusted, the adjusted neural network may be further trained and then proceed to subsequent operations.

The training is a process of enabling the neural network to process training samples, and adjusting the weight value (excluding the weight precision) of each layer in the neural network according to a difference between the processing result and a standard result, so as to improve the recognition rate of the neural network.

At operation S103, determining, according to the corrected neural network, a final weight precision of each layer to obtain a final neural network.

The final neural network has a recognition rate greater than the target threshold.

According to the specific condition of the corrected neural network, a final weight precision of each layer in the neural network is determined, and thus a final neural network with a recognition rate greater than the target threshold is obtained.

The final weight precision may be specifically determined in different ways according to the relationship between the current threshold and the target threshold. For example, when the current threshold is equal to the target threshold, the weight precision of each layer in the corrected neural network may be directly used as the final weight precision; and when the current threshold is less than the target threshold, different operations (such as selecting a new current threshold and performing the above method again, or using the corrected neural network as the final neural network) may be performed according to the relationship between the recognition rate of the corrected neural network and the target recognition rate.

Therefore, in the embodiments of the present disclosure, the weight precision of each layer in a trained neural network (the preset neural network) with desired performance (the recognition rate greater than the target threshold) is adjusted so that the weight precision of each layer in the neural network is reduced as much as possible while ensuring the performance of the neural network (the recognition rate still greater than the target threshold). In other words, while ensuring that the training process of the neural network can be rapidly converged and takes a short time, and the recognition rate (accuracy rate) meets the requirements, it is also ensured that the neural network has a small scale, occupies small storage space, and involves a small computation volume, low energy consumption and low resource consumption during operation, thereby achieving the balance between performance and resource consumption.

In some embodiments, reducing the weight precision of at least one layer in the preset neural network includes: reducing weight precisions of multiple layers in the preset neural network.

As a manner provided in an embodiment of the present disclosure, the weight precisions of multiple layers in the preset neural network may be tried to be adjusted. Apparently, it is also feasible to adjust the weight precision of merely a single layer.

In some embodiments, reducing weight precisions of multiple layers in the preset neural network includes: selecting a current target layer from candidate layers, where each candidate layer is an unlocked layer; adjusting the weight precision of the current target layer; setting, if the termination condition is met, the weight precision of the current target layer to the corrected weight precision, and locking the current target layer and returning to the operation of selecting a current target layer from the candidate layers; and returning, if the termination condition is not met, to the operation of adjusting the weight precision of the current target layer.

Figure 3:
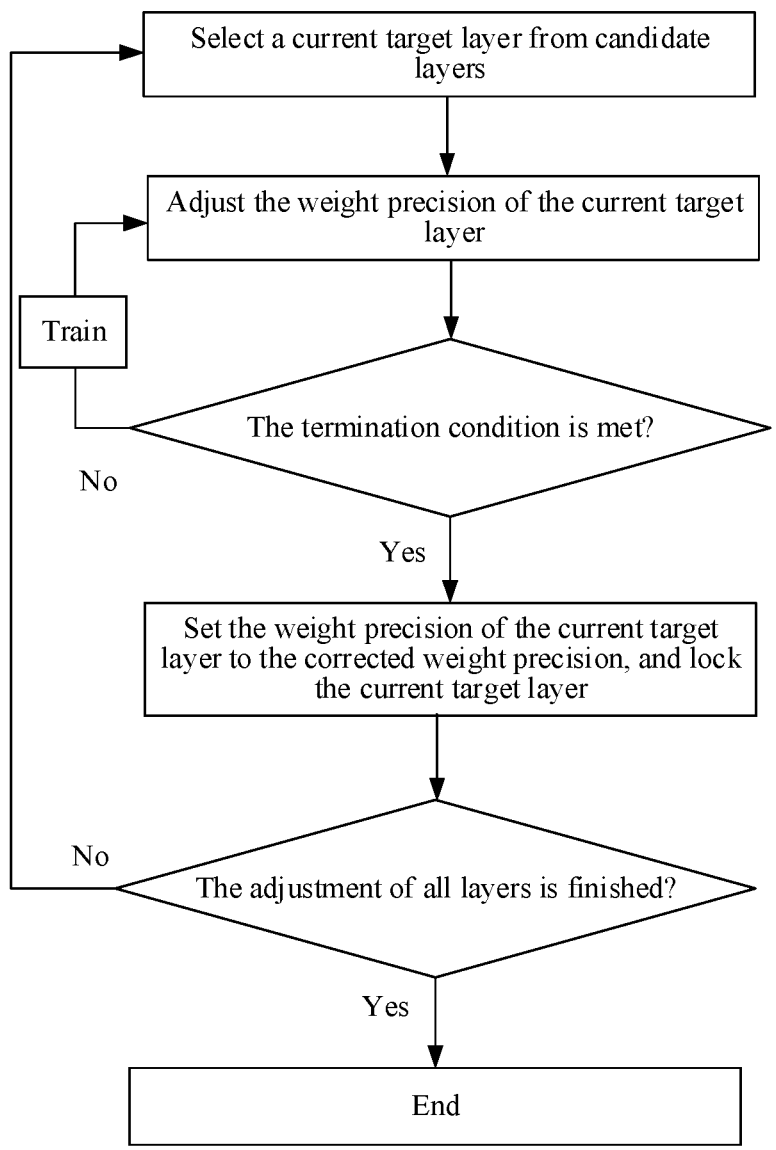
FIG. 3 is a schematic diagram illustrating a process of reducing the weight precisions of multiple layers in a weight precision configuration method according to an embodiment of the present disclosure.

Referring to FIG. 3, as an embodiment provided in the present disclosure, one of the candidate layers not adjusted yet (i.e., unlocked layers) may be selected as the current target layer, and the weight precision of the current target layer is adjusted. Then, it is judged whether the termination condition is met (i.e., whether the adjustment of the layer is finished). If the termination condition is not met, the weight precision of the current target layer is further adjusted; and if the termination condition is met, it is determined that the adjustment of the layer is finished, so the weight precision of the layer is set to the corrected weight precision and lock the layer (that is, the weight precision of the layer is locked and cannot be changed), and another layer is selected from the candidate layers as a new current target layer. Apparently, if it is determined that the adjustment of all layers is finished (all layers are locked, and there is no candidate layer left), the method provided in the embodiment of the present disclosure is finished as a whole.

For example, assuming that the preset neural network has four layers L1, L2, L3, and L4, then layer L2 may be adjusted after the adjustment of layer L1 is finished, layer L3 may be adjusted after the adjustment of layer L2 is finished, and layer L4 may be adjusted after the adjustment of layer L3 is finished.

In the above manner, it is after the weight precision adjustment of one layer is "finished" that the adjustment of another layer begins, so that the weight precision of each layer can be sufficiently reduced.

In some embodiments, reducing weight precisions of multiple layers in the preset neural network includes: starting a round of adjustment; selecting a current target layer from candidate layers, where each candidate layer is an unlocked layer with a weight precision not adjusted in the current round of adjustment; adjusting the weight precision of the current target layer; setting, if the termination condition is met, the weight precision of the current target layer to the corrected weight precision, and locking the current target layer; returning, if there is still a candidate layer in the current round of adjustment, to the operation of selecting a current target layer from the candidate layers; and returning, if there is no candidate layer left in the current round of adjustment, to the operation of starting a round of adjustment.

Figure 4:
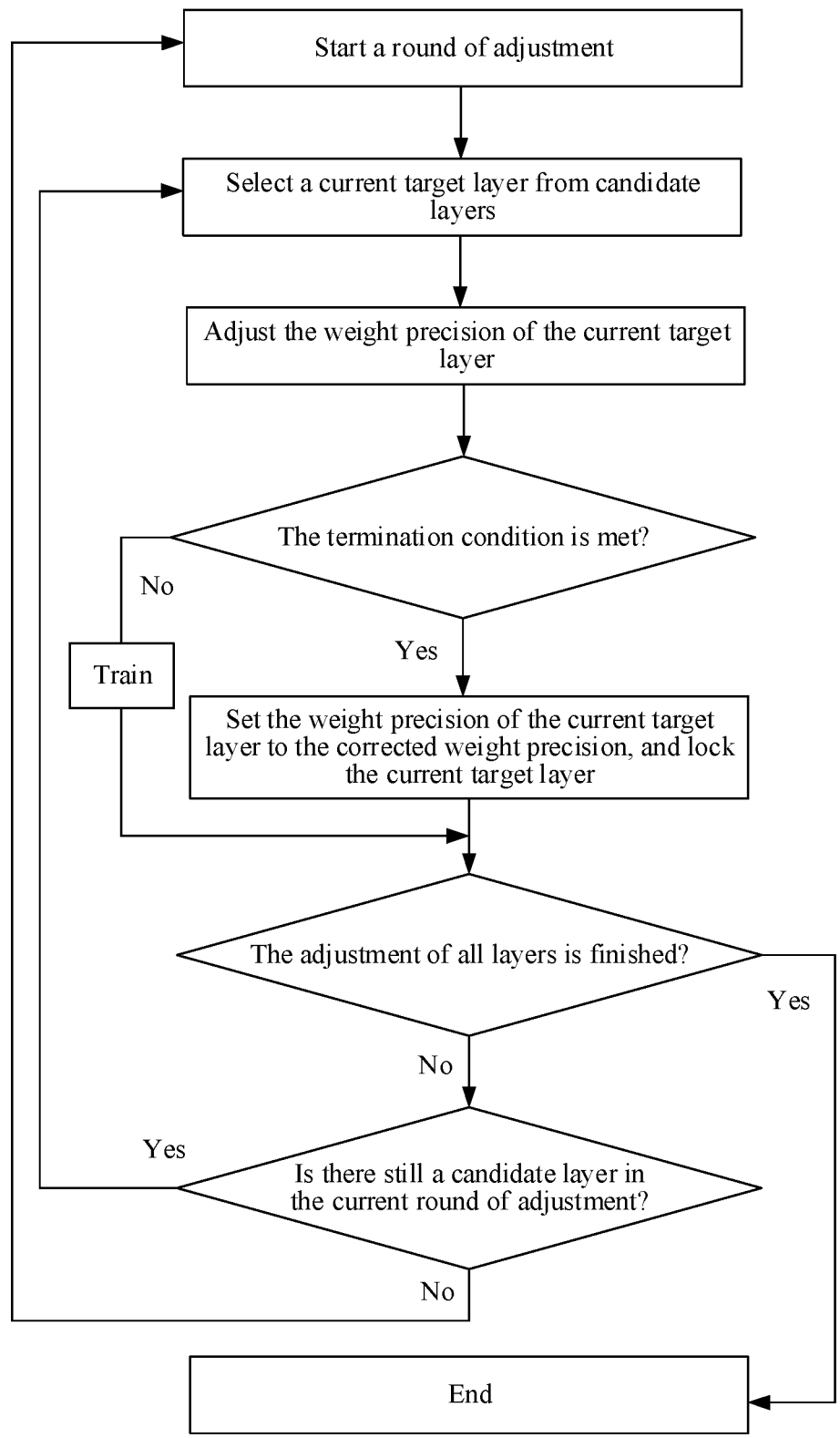
FIG. 4 is a schematic diagram illustrating another process of reducing the weight precisions of multiple layers in a weight precision configuration method according to an embodiment of the present disclosure.

Referring to FIG. 4, as another embodiment provided in the present disclosure, the adjustment of the multiple layers may be performed in "separate rounds", where the weight precision of each layer is adjusted merely once in each round of adjustment. At the beginning of each round of adjustment, a current target layer is selected from candidate layers which are not locked or adjusted in the current round of adjustment, and the weight precision of the current target layer is adjusted. Then, it is judged whether the termination condition is met (i.e., whether the adjustment of the layer is finished). If the termination condition is met, it is determined that the adjustment of the layer is finished, so the weight precision of the layer is set to the corrected weight precision and lock the layer (that is, the weight precision of the layer is locked and cannot be changed). Next, it is judged whether the current round of adjustment is finished (i.e., whether there is any candidate layer left in the current round of adjustment). If the current round of adjustment is not finished, a new current target layer is selected from the candidate layers in the current round of adjustment. If the current round of adjustment is finished, a new round of adjustment is started, and all the unlocked layers become candidate layers again in this round of adjustment. Apparently, if it is determined that the adjustment of all layers is finished (all layers are locked), the method provided in the embodiment of the present disclosure is finished as a whole.

For example, assuming that the preset neural network has four layers L1, L2, L3, and L4, then in each round of adjustment, layer L2 may be adjusted after layer L1 is adjusted once, layer L3 may be adjusted after layer L2 is adjusted once, layer L4 may be adjusted after layer L3 is adjusted once, and after layer L4 is adjusted once, the current round of adjustment is ended. Thereafter, a new round of adjustment can be started, in which layer L1 can be further adjusted.

After the weight precision of each layer is adjusted "in turn" in the above mode, the weight precision of each layer can be reduced relatively "uniformly".

In some embodiments, selecting the current target layer from the candidate layers includes: selecting a layer having the highest influence degree on the recognition rate of the neural network from the candidate layers as the current target layer; or selecting a layer having the lowest influence degree on the recognition rate of the neural network from the candidate layers as the current target layer.

As an embodiment provided in the present disclosure, when multiple layers are desired to be adjusted (either by adjusting one layer after the adjustment of a previous layer is finished, or by adjusting "in turn" as described above), the current target layer to be adjusted may be selected according to an order (including an ascending order or a descending order) of influence degrees of current candidate layers (i.e., layers that can still be adjusted currently) on the recognition rate of the neural network.

The influence degree of a layer on the recognition rate of the neural network refers to a degree of change caused to the recognition rate of the whole neural network when other parameters of the neural network remain unchanged and merely the weight precision of the layer is changed by unit degree.

When a layer with a higher influence degree on the recognition rate of the neural network is firstly adjusted, the layer that is most likely to influence the recognition rate may be adjusted to a proper degree in advance, so that an unqualified recognition rate can be generally avoided in subsequent adjustment.

When a layer with a lower influence degree on the recognition rate of the neural network is firstly adjusted, generally, the weight precision of the layer to be firstly adjusted can be reduced to a greater extent without causing excessive influence on the recognition rate of the neural network.

In some embodiments, between determining the pre-trained preset neural network and reducing the weight precision of at least one layer in the preset neural network, the method further includes: determining the initial recognition rate of the preset neural network; respectively reducing, for each layer in the preset neural network, the weight precision of the layer by a same value from the preset weight precision of the layer, and determining a reduction value of a reduced recognition rate of the preset neural network from the initial recognition rate; determining, according to a relationship of the reduction values of the layers, a relationship of influence degrees of the layers on the recognition rate of the neural network, where the greater the reduction value of a layer, the higher the influence degree of the layer on the recognition rate of the neural network.

To determine the adjustment sequence according to the influence degree of each layer on the recognition rate of the neural network, the influence degree of each layer on the recognition rate of the neural network may be determined in advance. That is, the weight precisions of the layers are respectively reduced by a same value (for example, each reduced by one level); and then the corresponding reduction degree (reduction value) of the recognition rate of the neural network after the weight precision of each layer is reduced is tested, so as to determine the influence degree of each layer on the recognition rate of the neural network according to the reduction value. Specifically, the greater the reduction value corresponding to a certain layer, the higher the influence degree of the layer on the recognition rate of the neural network.

For at least two layers with a same reduction value, the influence degrees thereof on the recognition rate of the neural network may be ranked according to a distance (i.e., the number of intermediate layers) between each layer and an input layer of the neural network. Specifically, the smaller the distance, the higher the influence degree of the layer on the recognition rate of the neural network.

It will be appreciated that by "respectively reducing the weight precision", it means that when the weight precision of a layer is reduced from the preset weight precision thereof, other layers maintains their respective preset weight precisions. Moreover, the above process is merely intended to determine the influence degree of each layer on the recognition rate of the neural network, and when the operation of "reducing the weight precision of at least one layer in the preset neural network (S102)" is started, all layers in the preset neural network should maintain their respective preset weight precisions.

In some embodiments, selecting the current target layer from the candidate layers includes: selecting a layer with the largest number of weight values from the candidate layers as the current target layer; or selecting a layer with the smallest number of weight values from the candidate layers as the current target layer.

Alternatively, as another embodiment provided in the present disclosure, when multiple layers are desired to be adjusted (either by adjusting one layer after the adjustment of a previous layer is finished, or by adjusting "in turn" as described above), the current target layer to be adjusted may be selected according to an order (including an ascending order or a descending order) of the number of weight values contained in the current candidate layers (i.e., layers that can still be adjusted currently).

When the weight precision of each layer is reduced by the same value, the more weight values one layer includes, the more reduction of the total data amount will be caused, and the more significant reduction of the computation volume will be during operation of the neural network.

In some embodiments, reducing the weight precision of a layer includes: reducing the weight precision of the layer; returning, if a reduced recognition rate of the preset neural network is greater than the current threshold, to the operation of reducing the weight precision of the layer; and taking, if the reduced recognition rate of the preset neural network is less than or equal to the current threshold, the weight precision before the reduction as the corrected weight precision of the layer, and setting the weight precision of the layer to the corrected weight precision.

Figure 5:
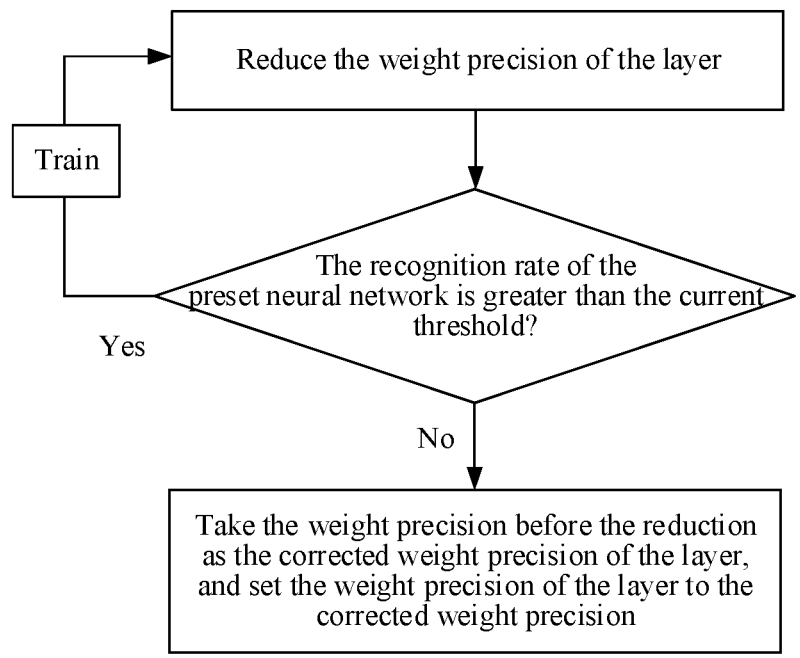
FIG. 5 is a schematic diagram illustrating another process of reducing the weight precision of one layer in a weight precision configuration method according to an embodiment of the present disclosure.

Referring to FIG. 5, as an embodiment provided in the present disclosure, adjusting the weight precision of each layer may include reducing (e.g., by one level each time) the weight precision of the layer from an initial value (i.e., the preset weight precision), that is, adjusting the weight precision of the layer; and judging whether the recognition rate of the preset neural network is greater than the current threshold (namely whether the termination condition is met) after each reduction. If the recognition rate of the preset neural network is greater than the current threshold, the weight precision of the layer is further reduced, and if the recognition rate of the preset neural network is not greater than the current threshold, that is, the recognition rate of the preset neural network after that time of reduction is less than or equal to the current threshold, which means that the preset neural network after the reduction becomes unqualified from qualified, the weight precision of the layer is set to the weight precision before the reduction, i.e., the corrected weight precision, and then the adjustment of the layer is ended.

It will be appreciated that the above manner of gradually reducing the weight precision is applicable to both the mode of adjusting another layer after the adjustment of a previous layer is finished, and the mode of adjusting in "separate rounds". The difference lies in that in the mode of adjusting another layer after the adjustment of a previous layer is finished, the weight precision of one layer is reduced for multiple times continuously; while in the mode of adjusting in "separate rounds", the weight precisions of the respective layers are reduced "in turn".

In some embodiments, reducing the weight precision of a layer includes: setting, if the weight precision of the layer is equal to the preset weight precision, the weight precision of the layer to a preset lowest precision; increasing the weight precision of the layer; returning, if an increased recognition rate of the preset neural network is less than or equal to the current threshold, the operation of increasing the weight precision of the layer; and taking, if the increased recognition rate of the preset neural network is greater than the current threshold, the increased weight precision as the corrected weight precision of the layer, and setting the weight precision of the layer to the corrected weight precision.

Figure 6:
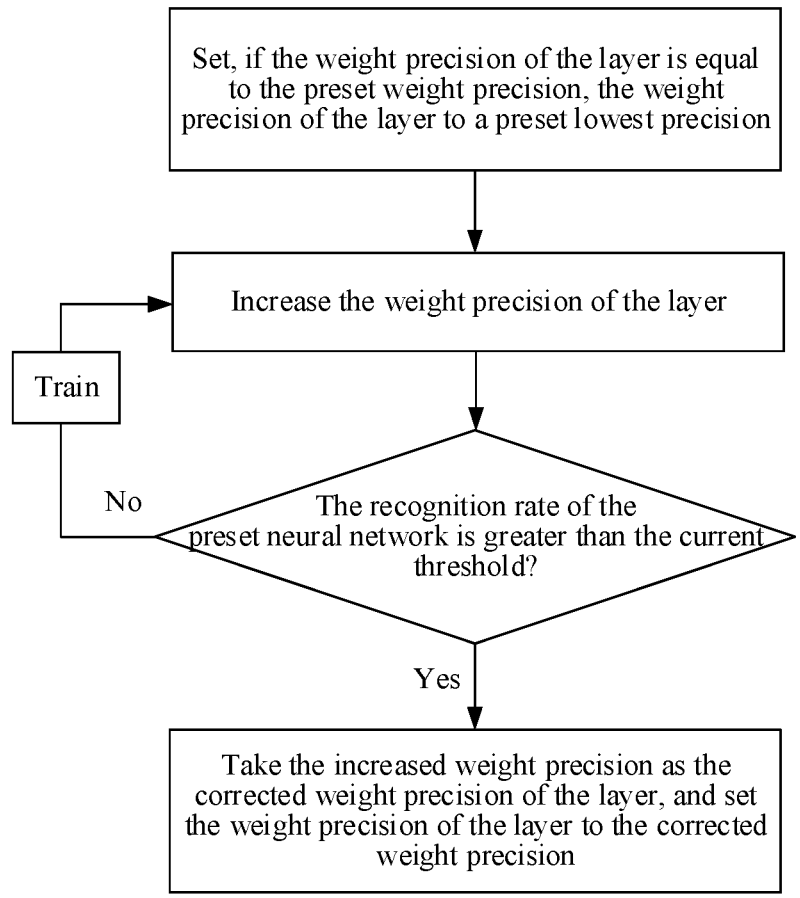
FIG. 6 is a schematic diagram illustrating another process of reducing the weight precision of one layer in a weight precision configuration method according to an embodiment of the present disclosure.

Referring to FIG. 6, as another embodiment provided in the present disclosure, adjusting the weight precision of each layer may include increasing (e.g., by one level each time) the weight precision of the layer from a minimum value (i.e., the preset lowest precision), that is, adjusting the weight precision of the layer; and judging whether the recognition rate of the preset neural network is greater than the current threshold (namely whether the termination condition is met) after each increase. If the recognition rate of the preset neural network is not greater than the current threshold, the weight precision of the layer is further increased; and if the recognition rate of the preset neural network is greater than the current threshold, that is, the recognition rate of the preset neural network after a certain time of increase is greater than the current threshold, which means that the preset neural network after the increase becomes qualified from unqualified, the current weight precision of the layer, i.e., the corrected weight precision, should be locked, and then the adjustment of the layer is ended.

The "preset lowest precision" described above is preset according to specific situations, and is, for example, an estimated lowest weight precision that can be achieved by each layer under the condition that the recognition rate of the neural network reaches the current threshold. The preset lowest precision may be the same or different for different layers.

It will be appreciated that the above manner of gradually increasing the weight precision is applicable to both the mode of selecting another layer after the adjustment of a previous layer is finished, and the mode of adjusting in "separate rounds".

It will be appreciated that the above process of "setting the weight precision of the layer to the preset lowest precision" is performed merely in the case that "the weight precision of the layer is equal to the preset weight precision thereof". In other words, for a layer, the weight precision of the layer is set to the preset lowest precision in advance only when the weight precision of the layer is increased for the "first time", while any subsequent increase is performed on the basis of a previously increased weight precision.

In some embodiments, returning, if the termination condition is not met, to the operation of adjusting the weight precision of the layer includes: training the preset neural network if the termination condition is not met, and returning to the operation of adjusting the weight precision of the layer.

Referring to FIGS. 2 to 6, as an embodiment provided in the present disclosure, each time the weight precision of one layer is adjusted (increased or reduced), the current neural network may be further trained, and then the next adjustment is performed.

The training is a process of enabling the neural network to process training samples, and adjusting the weight value (excluding the weight precision) of each layer in the neural network according to a difference between the processing result and a standard result, so as to improve the recognition rate of the neural network.

By training after adjusting the weight precision each time, the weight value of the neural network can be adapted to the adjusted weight precision as much as possible, so as to achieve a recognition rate as high as possible under the new weight precision.

In some embodiments, the current threshold is equal to the target threshold, and determining, according to the corrected neural network, the final weight precision of each layer includes: determining the weight precision of each layer in the corrected neural network as the final weight precision of the layer.

Figure 7:
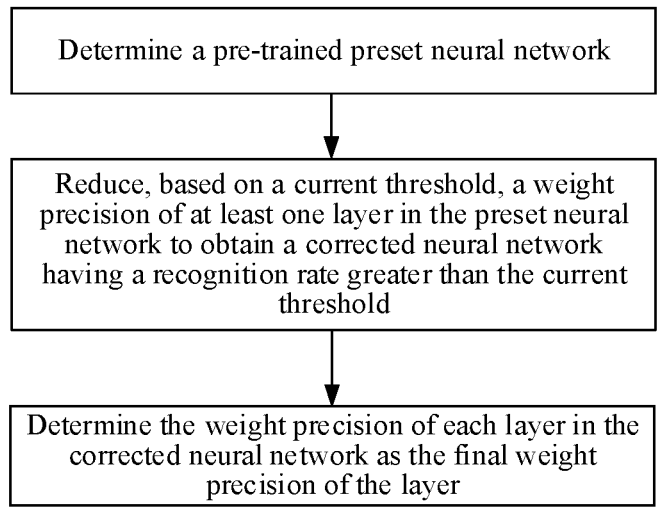
FIG. 7 is a flowchart of another weight precision configuration method according to an embodiment of the present disclosure.

Referring to FIG. 7, as an embodiment provided in the present disclosure, the target threshold may be directly used as the current threshold. That is, the process of "reducing the weight precision of at least one layer in the preset neural network" is performed based on the target threshold, so that the obtained recognition rate of the corrected neural network is ensured to reach the target threshold, and thus, the corrected neural network can be directly used as the final neural network.

In some embodiments, the current threshold is less than the target threshold, and determining, according to the corrected neural network, the final weight precision of each layer includes: training the corrected neural network; and determining, according to a relationship between the recognition rate of the trained corrected neural network and the target threshold, the final weight precision of each layer.

Figure 8:
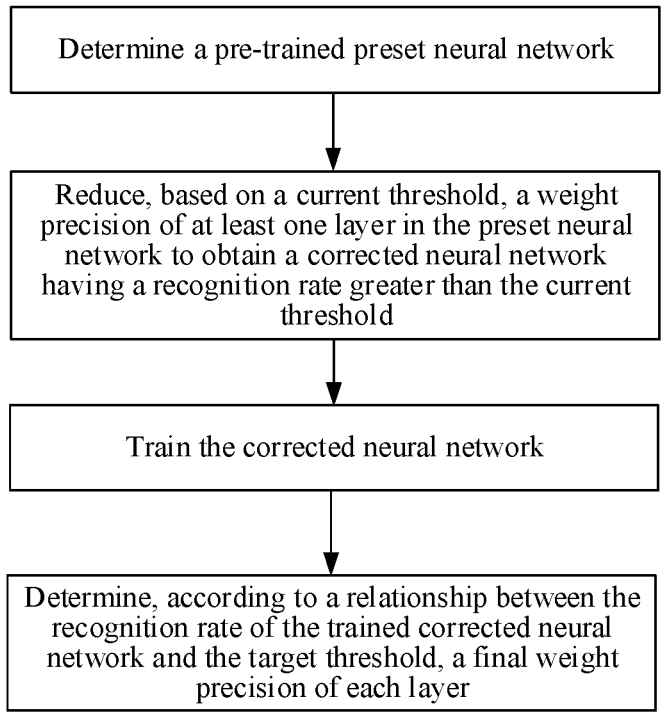
FIG. 8 is a flowchart of another weight precision configuration method according to an embodiment of the present disclosure.

Referring to FIG. 8, as another embodiment provided in the present disclosure, a lower current threshold may be set first, so the recognition rate of the corrected neural network obtained from the process of "reducing the weight precision of at least one layer in the preset neural network" can reach the current threshold, but may not reach the target threshold. Therefore, the corrected neural network is further trained, and then the final weight precision of each layer is determined according to the recognition rate achieved after training, thereby obtaining the final neural network.

For example, the method may include: taking, if the recognition rate of the trained corrected neural network reaches the target threshold, the trained corrected neural network as the final neural network.

In some embodiments, determining, according to the relationship between the recognition rate of the trained corrected neural network and the target threshold, the final weight precision of each layer includes: reducing the current threshold if the recognition rate of the trained corrected neural network is greater than the target threshold, and returning to the operation of reducing the weight precision of at least one layer in the preset neural network; and determining, if the recognition rate of the trained corrected neural network is less than or equal to the target threshold, the corrected weight precision of each layer in the corrected neural network after a previous training as the final weight precision of the layer.

Figure 9:
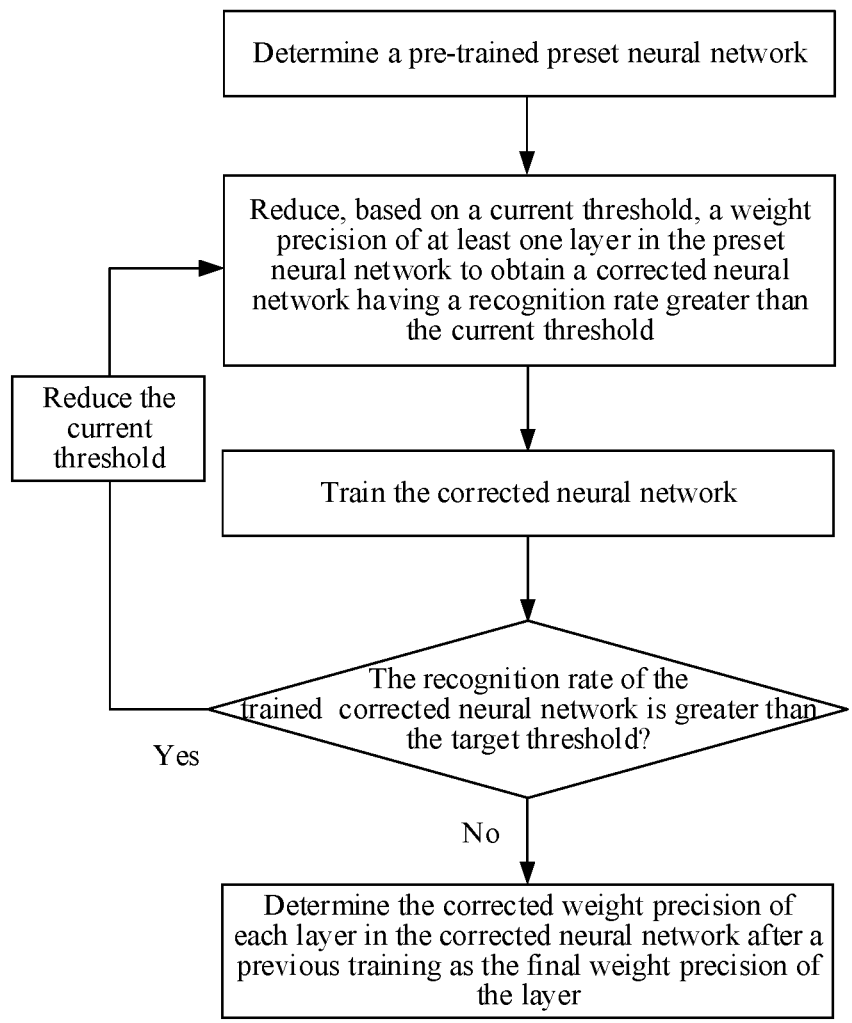
FIG. 9 is a flowchart of another weight precision configuration method according to an embodiment of the present disclosure.

As an embodiment provided the present disclosure, referring to FIG. 9, the method may include: judging, after obtaining and training the corrected neural network according to a certain current threshold, whether the recognition rate of the trained corrected neural network is greater than the target threshold; if the recognition rate of the trained corrected neural network is greater than the target threshold, re-selecting a current threshold with a smaller numerical value, and re-adjusting the weight precision of the preset neural network (the initial preset neural network) according to the new current threshold to obtain a new corrected neural network, where the recognition rate of the corrected neural network is relatively reduced, and the weight precision is reduced accordingly; and if the recognition rate of the trained corrected neural network is not greater than the target threshold, which indicates that the corrected neural network obtained according to the current threshold (a current threshold after a certain time of reduction) cannot reach the target threshold even if trained, namely the current threshold is too small, taking a previously trained corrected neural network as the final neural network.

In some embodiments, determining, according to the relationship between the recognition rate of the trained corrected neural network and the target threshold, the final weight precision of each layer includes: increasing the current threshold if the recognition rate of the trained corrected neural network is less than or equal to the target threshold, and returning to the operation of reducing the weight precision of at least one layer in the preset neural network; and determining, if the recognition rate of the trained corrected neural network is greater than the target threshold, the corrected weight precision of each layer in the trained corrected neural network as the final weight precision of the layer.

Figure 10:
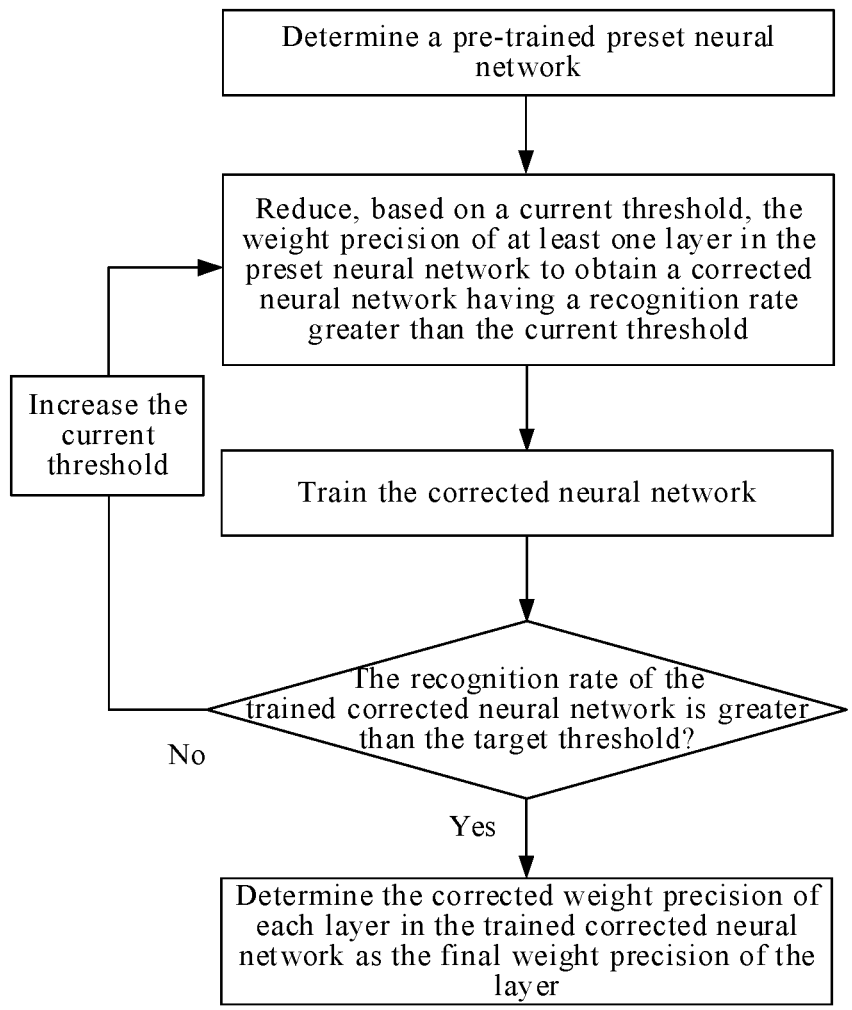
FIG. 10 is a flowchart of another weight precision configuration method according to an embodiment of the present disclosure.

Alternatively, referring to FIG. 10, as another embodiment provided in the present disclosure, the method may include: judging, after obtaining and training the corrected neural network according to a certain current threshold, whether the recognition rate of the trained corrected neural network is greater than the target threshold; if the recognition rate of the trained corrected neural network is not greater than the target threshold, which indicates that the corrected neural network obtained according to the current threshold is still unqualified after being trained, namely the current threshold is too small, re-selecting a greater current threshold, and re-adjusting the weight precision of the preset neural network (the initial preset neural network) according to the new current threshold to obtain a new corrected neural network, where the recognition rate of the corrected neural network is relatively increased, and the weight precision is increased accordingly; and if the recognition rate of the trained corrected neural network is greater than the target threshold, which indicates that the corrected neural network obtained according to the current threshold is qualified after being trained, taking the trained corrected neural network as the final neural network.

The current threshold may be increased or reduced in various manners.

For example, the method may include presetting a plurality of candidate thresholds of different values each having a lower recognition rate than the target recognition rate, and then selecting a current threshold each time in turn from the plurality of candidate thresholds in an ascending or descending order. For example, if the target threshold is set to 0.95, a plurality of current thresholds, such as 0.93, 0.91, 0.9, etc., may be set, and an appropriate current threshold may be selected from these thresholds each time.

Apparently, the method of determining the current threshold is not limited thereto. For example, the current threshold may be increased or reduced by a fixed value each time, or a new current threshold may be computed according to a difference between the recognition rate of the trained corrected neural network and the target recognition rate.

For each selected current threshold, the process of "reducing the weight precision of at least one layer in the preset neural network" based on the current threshold may be implemented in any specific manner provided in the embodiments of the present disclosure, either by adjusting another layer after the adjustment of one layer is finished, or by adjusting in "separate rounds". The weight precision of each layer may be gradually reduced or gradually increased.

Figure 11:
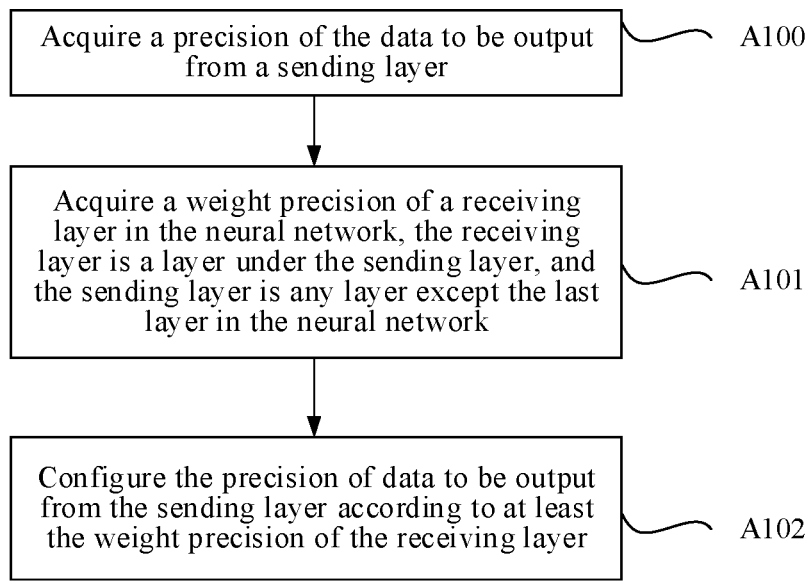
FIG. 11 is a flowchart of a training process of another weight precision configuration method according to an embodiment of the present disclosure.

Referring to FIG. 11, in some embodiments, training a neural network in any of the above embodiments (including training the corrected neural network and training the preset neural network after the weight precision adjustment) includes the following operations A101 and A102.

At A101, acquiring the weight precision of a receiving layer in the neural network, where the receiving layer is a layer under a sending layer, and the sending layer is any layer except the last layer in the neural network.

The sending layer and the receiving layer are two corresponding layers. That is, the receiving layer is a layer for receiving output data of a current sending layer. Therefore, the sending layer is not necessarily the first layer in the neural network, but may be any layer except the last layer. Accordingly, the receiving layer may be any layer except the first layer in the neural network.

In the embodiment of the present disclosure, the weight precision of each layer is obtained by adjusting in the method as described above; and during the training process, data transmission is also desired to be carried out among different layers of the neural network. When data is transmitted from the sending layer to the receiving layer, the weight precision of a corresponding receiving layer is desired to be obtained.

Exemplarily, the neural network may be arranged in a computer device which may include one or more processing cores. Other operations of the weight precision configuration method according to the embodiments of the present disclosure may also be executed by a computer device, and the computer device executing the other operations and the computer device for training may be a same computer device or different computer devices.

Exemplarily, each layer of the neural network may be arranged in one or more processing cores, while each processing core may include a processor and its own memory, so that the computation of each layer may be performed locally in the processing core where the layer is located, and the output data is sent to the processing core where a next layer is located. For example, a sending processing core where the sending layer is located may compute data to be output according to input data for the sending layer and weight parameters (such as a weight matrix or the like) of the sending layer, and output the data to a receiving processing core where the receiving layer is located.

At A102, configuring a precision of data to be output from the sending layer according to at least the weight precision of the receiving layer.

In the embodiment of the present disclosure, the precision of the data to be output from the sending layer is configured (or set) with reference to the weight precision of the receiving layer, and the configured data with the desired precision is taken as the data (output data) actually output from the sending layer, where the specific reference and configuration manners are not limited.

Exemplarily, the precision of the data to be output may be configured to be lower than the weight precision of the receiving layer, or to be higher than the weight precision of the receiving layer, or to be the same as the weight precision of the receiving layer, so as to obtain the precision of the output data.

In the training process of the neural network according to the embodiment of the present disclosure, the precision of data to be output from the sending layer in the neural network is acquired, and before the data to be output is output, the weight precision of the receiving layer is acquired, and then, the precision of the data to be output is configured according to the weight precision the receiving layer. Therefore, the precision of output data from one or more layers in the neural network can be flexibly configured, and the performance of the computer device can be optimized.

In some embodiments, as shown in FIG. 11, before acquiring the weight precision of the receiving layer in the neural network, the method further includes: A100, acquiring the precision of the data to be output from the sending layer.

Before acquiring the weight precision of the receiving layer, the precision of the data to be output from the sending layer, i.e., an "original" precision that the data to be output from the sending layer should have, may be firstly acquired, which is, for example, a precision of a computation result obtained by multiplying and accumulating the input data and the weight data of the sending layer.

In some embodiments, acquiring the precision of the data to be output from the sending layer includes: acquiring the precision of input data of the sending layer and the weight precision of the sending layer; and determining, according to the precision of the input data and the weight precision of the sending layer, the precision of the data to be output from the sending layer, where the precision of the data to be output is greater than or equal to the higher one of the precision of the input data and the weight precision of the sending layer.

In an embodiment of the present disclosure, the precision of the data to be output from the sending layer may be determined according to the precision of the input data and the weight precision of the sending layer, which specifically includes ensuring that the precision of the data to be output is greater than or equal to the higher one of the precision of the input data and the weight precision. This can be implemented because the precision of the result obtained from the multiply-accumulate operation is generally higher than either of the two parameters used in the operation.

In some embodiments, configuring the precision of data to be output from the sending layer according to at least the weight precision of the receiving layer includes: determining a target precision according to the precision of the data to be output and the weight precision of the receiving layer; and configuring the precision of the data to be output to the target precision.

In an embodiment of the present disclosure, a common "target precision" may be determined according to the weight precision of the receiving layer and the precision of the data to be output from the sending layer obtained above, and the precision of the data to be output may be configured to be target precision, i.e., the actual output data from the sending layer is set to the target precision.

In some embodiments, when the weight precision of the receiving layer is lower than the precision of the data to be output, the target precision is lower than the precision of the data to be output, and is not lower than the weight precision of the receiving layer.

When the precision (original precision) of the data to be output is higher than the weight precision, the precision of the data to be output may be reduced, but should not be lower than the weight precision, so as not to influence the recognition rate of the neural network. The advantages of such configuration lie in that it is equivalent to intercepting the precision of the data to be output according to the weight precision the receiving layer, so that the precision of the data to be output, and thus the data transmission amount, are reduced, and during data computation by the receiving layer, the computation volume is reduced and thus less the energy consumption is involved in data processing.

At this time, the target precision may be equal to the weight precision of the receiving layer, that is, the weight precision of the receiving layer may be directly determined as the target precision. The advantages of such configuration lie in that it is equivalent to intercepting the precision of the data to be output to be the same as the weight precision of the receiving layer, so that the data transmission amount can be reduced to the maximum extent, the energy consumption involved in data processing can be reduced, and the computing capability can be improved.

In some embodiments, when the weight precision of the receiving layer is not lower than the precision of the data to be output, the target precision is not lower than the precision of the data to be output, and is not higher than the weight precision of the receiving layer.

When the precision (original precision) of the data to be output is not higher than (including the same as or lower than) the weight precision, the precision of the data to be output may remain unchanged, or the precision of the data to be output may be increased, but not higher than the weight precision, so as to improve the recognition rate of the neural network.

At this time, the target precision may also be equal to the weight precision of the receiving layer, that is, the weight precision of the receiving layer may be directly determined as the target precision.

In some embodiments, configuring the precision of data to be output from the sending layer according to at least the weight precision of the receiving layer includes: determining the weight precision of the receiving layer as target precision; and configuring the precision of the data to be output to the target precision.

As another embodiment provided in the present disclosure, the weight precision of the receiving layer may be directly determined as the target precision without determining the relationship between the weight precision of the receiving layer and the precision of the data to be output from the sending layer. In this manner, the implementation process of the method can be simplified, the precision of input data for computation in a layer is ensured to be equal to the weight precision of the layer, and the relationship among the storage capacity, the computation energy consumption and the recognition rate (or accuracy rate) of the neural network can be better balanced.

In some embodiments, after configuring the precision of data to be output from the sending layer according to at least the weight precision of the receiving layer, the method further includes: outputting the configured output data to the receiving layer.

After the precision of the data to be output is configured, the configured data with the desired precision may be directly transmitted to the receiving layer as output data, for example, to the receiving processing core where the receiving layer is located, so that the processing core corresponding to the receiving layer performs related computation of the receiving layer.

In some embodiments, the computer device is implemented on a many-core architecture.

The many-core architecture includes a plurality of processing cores and may have a multi-core recombination characteristic. There is no master or slave among the processing cores, and tasks may be flexibly configured by software. Different tasks are simultaneously configured in different processing cores (for example, each processing core is configured with a layer of neurons), and thus, parallel processing of multiple tasks is implemented. The computation of the neural network may be implemented by a series of processing cores which form an array, so that various neural network algorithms can be efficiently supported, and performance of the device is improved.

Exemplarily, the computer device may employ a network on chip, such as a two-dimensional mesh (2D Mesh) network on chip, which is used for communication interconnection between the cores, while communication between the device and the outside may be implemented through a high-speed serial port.

Figure 12:
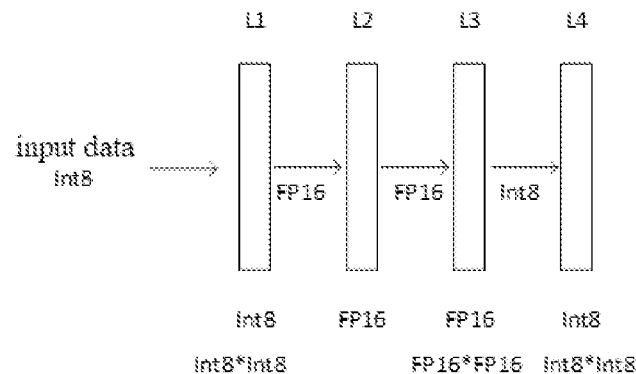
FIG. 12 is a schematic diagram illustrating precisions of respective layers during a training process of a weight precision configuration method according to an embodiment of the present disclosure.

FIG. 12 is a schematic diagram illustrating precisions of respective layers in a neural network during a training process according to an embodiment of the present disclosure, which includes: the weight precision of each layer (the precision indicated below each layer in the figure), the precision of the output data from each layer (the precision indicated by the arrow between layers in the figure), and the precision computation process corresponding to the computation process of the input data and the weight data of each layer (the multiplication of the two precisions lowest in the figure).

As shown in FIG. 12, for convenience of illustration, merely four layers of the neural network are shown, which are layers L1, L2, L3 and L4 from front to back. For layer L1, the precision of the input data is Int8, and the weight precision of layer L1 is Int8, so the computation process of the corresponding precision in the multiply-accumulate operation is Int8*Int8, obtaining that the precision of the computation result is FP16. However, in the existing art, if the precision of the output data is collectively set to Int8, it should be ensured that the precision of the actual output data from layer L1 is Int8. That is, the precision FP16 of the above computation result should be intercepted into Int8, and then the data with the precision Int8 is output from layer L1. Since the weight precision of layer L2 is FP16, when the computation is performed in layer L2, the intercepted precision Int8 should be supplemented to the precision FP16 again, which causes the loss of the precision that is intercepted first in the process, and introduces unnecessary interception and supplementation processes, consuming more computation volume.

In the embodiments of the present disclosure, the weight precision of layer L2 is acquired first, so it is known that the original precision (the precision of the computation result) of the data to be output from layer L1 is the same as the weight precision of layer L2 (both are FP16). Therefore, according to the weight precision of layer L2, the precision of the data to be output should be configured to FP16, that is, instead of intercepting the precision of the data to be output (the computation result), the data to be output is directly output to obtain the output data with the precision FP16, which can reduce precision loss in data conversion and avoid unnecessary operations.

For layer L3, the precision of the input data is FP16, and the weight precision is FP16. In the existing art, if the precision of the output data is collectively set to FP16, the precision of the output data from layer L3 should also be FP16 (in fact, this FP16 is also obtained by intercepting the precision of the computation result). However, since the weight precision of layer L4 is Int8, the actual data precision desired for the computation is merely Int8. Therefore, if the precision of the output data from layer L3 is FP16, it is equivalent to adding a part of "useless" data transmission amount between layers L3 and L4.

In the embodiments of the present disclosure, the weight precision of layer L4, i.e., Int8, is acquired first, so when it is known that the original precision of the data to be output from layer L3 is higher than the weight precision of layer L4, the precision of the data to be output may be configured to Int8. That is, the precision of the computation result of layer L3 is directly and accurately intercepted to Int8 (instead of being intercepted to FP16). Therefore, the precision of the actual output data is Int8, and merely the data with the precision Int8 is to be transmitted between layers L3 and L4. Compared with the existing art, the method provided in the embodiments of the present disclosure reduces the precision of the output data from layer L3, as well as the data transmission amount between layers L3 and L4, that is, reduces the data communication amount between the processing core where the layer L3 is located and the processing core where the layer L4 is located, has no influence on the computation precision of layer L4, and greatly improves the performance.

Some specific examples of the weight precision configuration method according to the embodiment of the present disclosure are described in detail below.

A weight precision configuration method according to an embodiment of the present disclosure includes the following operations B401 to B406.

At B401, determining a current target layer in the neural network.

All layers in the neural network are ranked according to their influence degrees on the recognition rate, and among the layers of which the corresponding weight precisions are not locked, the layer with a lower influence degree on the recognition rate of the neural network is preferentially determined as the target layer. When this operation is performed for the first time, the layer with a minimum reduction value (the reduction value is generated in the process of determining the influence degree of each layer on the recognition rate of the neural network, similarly hereinafter) is determined as the current target layer, that is, the layer with the lowest influence degree on the recognition rate is determined as the current target layer. When this operation is performed again, a new current target layer is switched according to the ranking result. If the weight precision corresponding to a certain layer is locked, the layer will not become the target layer again, that is, will not become a new current target layer.

Exemplarily, before this operation, the method may further include: computing an initial recognition rate of the neural network; reducing, for each layer in the neural network, the weight precision of the layer from a first precision to a second precision, and computing a reduction value of the recognition rate of the neural network after the above change relative to the initial recognition rate; and ranking all the layers according to the reduction value (i.e., ranking the layers according to the influence degree of each layer on the recognition rate of the neural network) to obtain a ranking result, where the greater the reduction value corresponding to a layer, the higher the influence degree of the layer on the recognition rate of the neural network.

At B402, reducing the weight precision corresponding to the current target layer.

Exemplarily, the weight precision corresponding to the current target layer may be reduced by one level. Each reduction hereinafter may refer to reducing by one level of precision.

At B403, judging whether the recognition rate of the neural network is less than a target threshold, performing B404 if the recognition rate of the neural network is less than the target threshold; and otherwise, performing B406.

At B404, locking the weight precision corresponding to the current target layer as the weight precision before reduction.

At B405, judging whether the weight precision corresponding to each layer is locked, ending the process if the weight precision corresponding to each layer is locked; and otherwise, returning to B401.

Exemplarily, the locked weight precision is marked in a bit flag or a name of a calling operator of the current target layer.

At B406, training the neural network to adjust the weight value of each layer, and returning to B402.

The training aims to improve the recognition rate of the neural network.

Exemplarily, the training of the neural network is performed on a computer device, and the training process may refer to the above related contents, which is not described in detail herein.

In the embodiment of the present disclosure, all the layers in the neural network are ranked according to their influence degrees on the recognition rate of the neural network, and the weight precision of each current target layer is tried to be reduced in sequence, until the recognition rate of the neural network is less than the target threshold. Therefore, the configuration of the weight precision can be rapidly implemented, and while ensuring the recognition rate of the neural network, the neural network model is reduced, the resource utilization rate and the performance are improved, and the power consumption is reduced.

In a weight precision configuration method according to an embodiment of the present disclosure, the weight precisions corresponding to all the layers in the neural network are subjected to multiple rounds of reduction, and in each round, the weight precision corresponding to each layer is reduced once. The reduction in "each round" specifically includes the following operations B501 to B507.

At B501, determining a current target layer in the neural network.

All layers in the neural network are ranked according to their influence degrees on the recognition rate of the neural network, and the layer with a lower influence degree on the recognition rate of the neural network is preferentially determined as the target layer.

At B502, reducing the weight precision corresponding to the current target layer.

At B503, judging whether the recognition rate of the neural network is less than a target threshold, performing B504 if the recognition rate of the neural network is less than the target threshold; and otherwise, performing B506.

At B504, locking the weight precision corresponding to the current target layer as the weight precision before reduction, which means that the layer will not be selected as the current target layer in subsequent processes (including the current round and any subsequent round of reduction) for weight precision adjustment.

At B505, judging whether the weight precision corresponding to each layer is locked, ending the process if the weight precision corresponding to each layer is locked; and otherwise, returning to B501.

At B506, temporarily storing the reduced weight precision. In other words, when the weight precision of the layer is further reduced in a next round of reduction, the reduction is performed on the current temporarily stored weight precision.

Exemplarily, the temporarily stored weight precision is marked in a bit flag or a name of a calling operator of the current target layer.

At B507, training the neural network to adjust the weight value of each layer, and returning to B501, until there is no layer that can be selected as the current target layer in this round, and then starting a new round of reduction.

A weight precision configuration method according to an embodiment of the present disclosure includes the following operations C401 to C407.

At C401, determining a current target layer in the neural network.

All layers in the neural network are ranked according to their influence degrees on the recognition rate of the neural network, and among the layers of which the corresponding weight precisions are not locked, the layer with a higher influence degree on the recognition rate of the neural network is preferentially determined as the target layer. When this operation is performed for the first time, the layer with the largest reduction value, that is, the layer with the highest influence degree on the recognition rate, is determined as the current target layer. When this operation is performed again, a new current target layer is switched according to the ranking result. If the weight precision corresponding to a certain layer is locked, the layer will not become the target layer again, that is, will not become the new current target layer.

At C402, reducing the weight precision corresponding to the current target layer to a preset lowest precision.

At C403, increasing the weight precision corresponding to the current target layer.

Exemplarily, the weight precision corresponding to the current target layer may be increased by one level. Each increase hereinafter may refer to increasing by one level of precision.

At C404, judging whether the recognition rate of the neural network is greater than a target threshold, performing C405 if the recognition rate of the neural network is greater than the target threshold; and otherwise, performing C407.

At C405, locking the weight precision corresponding to the current target layer as a current weight precision.

At C406, judging whether the weight precision corresponding to each layer is locked, ending the process if the weight precision corresponding to each layer is locked; and otherwise, returning to C401.

At C407, training the neural network to adjust the weight value of each layer, and returning to C403.

In the embodiments of the present disclosure, all the layers in the neural network are ranked according to their influence degrees on the recognition rate of the neural network, and the weight precision of each current target layer is first tried to be reduced to minimum in sequence, and then increased, until the recognition rate of the neural network is greater than the target threshold. Therefore, the configuration of the weight precision can be rapidly implemented, and while ensuring the recognition rate of the neural network, the model size of the neural network is effectively controlled, the resource utilization rate and the performance are improved, and the power consumption is reduced.

In a weight precision configuration method according to an embodiment of the present disclosure, the weight precisions corresponding to all the layers in the neural network are subjected to multiple rounds of increase, and in each round, the weight precision corresponding to each layer is increased once. The increase in "each round" specifically includes the following operations C501 to C509.

At C501, determining a current target layer in the neural network.

All layers in the neural network are ranked according to their influence degrees on the recognition rate of the neural network, and the layer with a lower influence degree on the recognition rate of the neural network is preferentially determined as the target layer.

At C502, judging whether the weight precision corresponding to the current target layer has been adjusted, performing C504 if the weight precision corresponding to the current target layer has been adjusted; and otherwise, performing C503.

At C503, reducing the weight precision corresponding to the current target layer to a preset lowest precision.

At C504, increasing the weight precision corresponding to the current target layer.

At C505, judging whether the recognition rate of the neural network is greater than a target threshold, performing C506 if the recognition rate of the neural network is greater than the target threshold; and otherwise, performing C508.

At C506, locking the weight precision corresponding to the current target layer as a current weight precision, which means that the layer will not be selected as the current target layer in subsequent processes (including the current round and any subsequent round of increase) for weight precision adjustment.

At C507, judging whether the weight precision corresponding to each layer is locked, ending the process if the weight precision corresponding to each layer is locked; and otherwise, returning to C501.

At C508, temporarily storing the increased weight precision. In other words, when the weight precision of the layer is further increased in a next round of increase, the increase is performed on the current temporarily stored weight precision.

At C509, training the neural network to adjust the weight value of each layer, and returning to C501, until there is no layer that can be selected as the current target layer in this round, and then starting a new round of increase.

A weight precision configuration method according to an embodiment of the present disclosure includes the following operations D401 to D405.

At D401, determining a current threshold from at least two candidate thresholds.

A candidate threshold with a greater value is preferentially determined as the current threshold.

At D402, reducing the weight precision corresponding to each layer in the neural network based on the current threshold.

For the specific reduction operation, reference may be made to the related contents described above and is not described in detail here.

At D403, training the neural network subjected to the reduction to adjust the weight value of each layer.

At D404, judging whether the recognition rate of the trained neural network can reach a target threshold, returning to D401 if the recognition rate of the trained neural network can reach the target threshold; and otherwise, performing D405.

At D405, determining the weight precision corresponding to each layer after the last reduction as a final configuration result.

According to the weight precision configuration method provided in the embodiment of the present disclosure, the weight precision of each layer in the neural network is tried to be reduced taking a current threshold lower than the target threshold as a reference in sequence from large to small, and after the reduction, the recognition rate is improved by training the neural network to adjust the weight value, so that the recognition rate loss caused by reducing the weight precision is made up. If the target threshold can be met, the weight precision may be tried to be further reduced taking an even lower current threshold as the reference, thereby implementing reduction of the weight precision are realized step by step. Therefore, while ensuring the recognition rate of the neural network, the resource utilization rate and the performance are improved, and the power consumption is reduced.

A weight precision configuration method according to an embodiment of the present disclosure includes the following operations D501 to D509.

At D501, determining a minimum value of at least two candidate thresholds as a current threshold.

At D502, reducing the weight precision corresponding to each layer in the neural network based on the current threshold.

At D503, training the neural network subjected to the reduction to adjust the weight value of each layer.

At D504, judging whether the recognition rate of the trained neural network can reach a target threshold, performing D505 if the recognition rate of the trained neural network can reach the target threshold; and otherwise, performing D506.

At D505, determining the weight precision corresponding to each layer after this reduction as a final configuration result, and ending the process.

At D506, re-determining the current threshold.

In this operation, after the smallest candidate threshold is excluded, the current threshold is sequentially determined in an order from small to large.

At D507, re-reducing the weight precision corresponding to each layer in the neural network based on the current threshold, or increasing the weight precision corresponding to each layer in the neural network based on the current threshold.

Re-reducing the weight precision corresponding to each layer in the neural network based on the current threshold may specifically refers to re-reducing the weight precision corresponding to each layer in the neural network from the initial weight precision based on the current threshold. Increasing the weight precision corresponding to each layer in the neural network based on the current threshold may specifically refers to increasing the current weight precision (temporarily stored) corresponding to each layer in the neural network based on the current threshold.

At D508, re-judging whether the recognition rate of the trained neural network can reach the target threshold, performing D509 if the recognition rate of the trained neural network can reach the target threshold to end the process; and otherwise, returning to D506.

A weight precision configuration method according to an embodiment of the present disclosure includes the following operations E401 to E406.

At E401, determining a current target layer in the neural network.

All layers in the neural network are ranked according to their corresponding number of weight values, and among the layers of which the corresponding weight precisions are not locked, a layer with a larger number of weight values is preferentially determined as the target layer. When this operation is performed for the first time, a layer with the largest number of weight values is determined as the current target layer. When this operation is performed again, a new current target layer is switched according to the ranking result. If the weight precision corresponding to a certain layer is locked, the layer will not become the target layer again, that is, will not become the new current target layer.

Exemplarily, before this operation, the method may further include: acquiring the number of weight values corresponding to each layer in the neural network, and ranking all layers according to the number of weight values from many to few.

At E402, reducing the weight precision corresponding to the current target layer.

At E403, judging whether the recognition rate of the neural network is less than a target threshold, performing E404 if the recognition rate of the neural network is less than the target threshold; and otherwise, performing E406.

At E404, locking the weight precision corresponding to the current target layer as the weight precision before reduction.

At E405, judging whether the weight precision corresponding to each layer is locked, ending the process if the weight precision corresponding to each layer is locked; and otherwise, returning to E401.

At E406, training the neural network to adjust the weight value of each layer, and returning to E402.

In the embodiment of the present disclosure, all the layers in the neural network are ranked according to the number of weight values, and the weight precision of each current target layer is tried to be reduced in sequence, until the recognition rate of the neural network is less than the target threshold. Therefore, the configuration of the weight precision can be rapidly implemented, and while ensuring the recognition rate of the neural network, the neural network model is reduced, the resource utilization rate and the performance are improved, and the power consumption is reduced.

In a weight precision configuration method according to an embodiment of the present disclosure, the weight precisions corresponding to all the layers in the neural network are subjected to multiple rounds of reduction, and in each round, the weight precision corresponding to each layer is reduced once. The reduction in "each round" specifically includes the following operations E501 to E507.

At E501, determining a current target layer in the neural network.

All layers in the neural network are ranked according to their corresponding number of weight values, and a layer with a larger number of weight values is preferentially determined as the target layer.

At E502, reducing the weight precision corresponding to the current target layer.

At E503, judging whether the recognition rate of the neural network is less than a target threshold, performing E504 if the recognition rate of the neural network is less than the target threshold; and otherwise, performing E506.

At E504, locking the weight precision corresponding to the current target layer as the weight precision before reduction, which means that the layer will not be selected as the current target layer in subsequent processes (including the current round and any subsequent round of reduction) for weight precision adjustment.

At E505, judging whether the weight precision corresponding to each layer is locked, ending the process if the weight precision corresponding to each layer is locked; and otherwise, returning to E501.

At E506, temporarily storing the reduced weight precision. In other words, when the weight precision of the layer is further reduced in a next round of reduction, the reduction is performed on the current temporarily stored weight precision.

At E507, training the neural network to adjust the weight value of each layer, and returning to E501, until there is no layer that can be selected as the current target layer in this round, and then starting a new round of reduction.

Figure 13:
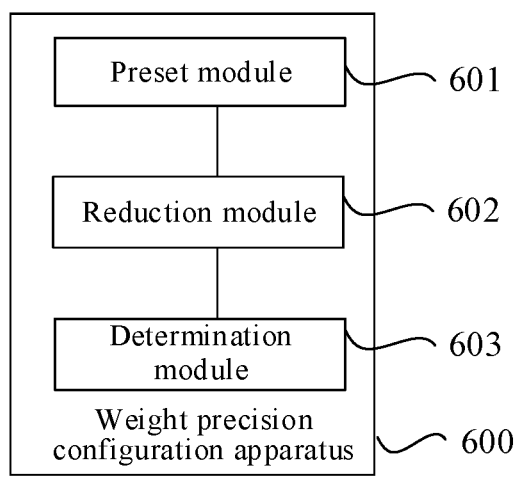
FIG. 13 is a block diagram of a weight precision configuration apparatus according to an embodiment of the present disclosure.

In a second aspect, referring to FIG. 13, an embodiment of the present disclosure provides a weight precision configuration apparatus 600, which includes the following preset module 601, reduction module 602, and determination module 603.

The preset module 601 is configured to determine a pre-trained preset neural network, where the preset neural network includes a plurality of layers each having a preset weight precision, and the preset neural network has an initial recognition rate greater than a target threshold.

The reduction module 602 is configured to reduce, based on a current threshold, the weight precision of at least one layer in the preset neural network to obtain a corrected neural network having a recognition rate greater than the current threshold. The current threshold is less than or equal to the target threshold, and reducing the weight precision of a layer includes: adjusting the weight precision of the layer; setting, if a termination condition is met, the weight precision of the layer to a corrected weight precision that is less than or equal to the preset weight precision of the layer; and returning, if the termination condition is not met, to the operation of adjusting the weight precision of the layer.

The determination module 603 is configured to determine, according to the corrected neural network, a final weight precision of each layer to obtain a final neural network. The final neural network has a recognition rate greater than the target threshold.

The weight precision configuration apparatus 600 according to the embodiment of the present disclosure can implement any one of the above weight precision configuration methods, which will not be described in detail here.

Figure 14:
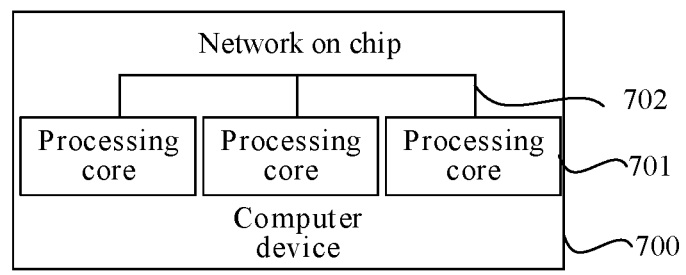
FIG. 14 is a block diagram of a computer device according to an embodiment of the present disclosure.

In a third aspect, referring to FIG. 14, an embodiment of the present disclosure provides a computer device 700, including at least one processing core 701 configured to implement any method described above.

In some embodiments, the device includes a plurality of processing cores 701 forming a many-core architecture.

The computer device according to the embodiment of the present disclosure may adopt a many-core architecture, which includes a plurality of processing cores 701 each including a processor and its own memory. Information interaction between different processing cores 701 may be implemented through a network on chip 702 (e.g., 2D Mesh), so that each processing core 701 may perform certain computation, and computation of the neural network can be implemented together with the plurality of processing cores 701.

For example, each processing core 701 may be configured with one layer of the neural network. Apparently, it is also feasible that the one processing core 701 is provided with more than one layer of the neural network, or with merely a part of one layer in the neural network, or with respective parts of multiple layers in the neural network.

The computer device with the many-core architecture may be implemented in various manners. For example, the device may include an array of multiple chips (ICs) each containing one or more processing cores 701. Alternatively, the device may include merely one chip containing a plurality of processing cores 701.

Figure 15:
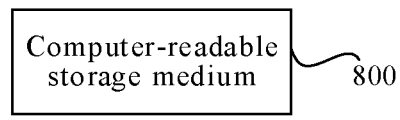
FIG. 15 is a block diagram of a computer-readable storage medium according to an embodiment of the present disclosure.

In a fourth aspect, referring to FIG. 15, an embodiment of the present disclosure provides a computer-readable storage medium 800 having a computer program stored thereon which, when executed by a processor, causes any method described above to be implemented.

The weight precision configuration apparatus, the computer device, and the computer-readable storage medium provided in the foregoing embodiments may implement the weight precision configuration method provided in any embodiment of the present disclosure, and have corresponding functional modules and beneficial effects for executing the method. Technical details that are not described in detail in the above embodiment may refer to the weight precision configuration method according to any embodiment of the present disclosure.

It is to be noted that the foregoing is merely an illustration of the preferred embodiments and principles of the applied technology in the present disclosure. Those skilled in the art will appreciate that the present disclosure is not limited to the particular embodiments described herein, and that various obvious changes, rearrangements and substitutions will now be apparent to those skilled in the art without departing from the scope of the present disclosure. Therefore, although the present disclosure has been described in some detail by the above embodiments, the present disclosure is not limited to the above embodiments, and may include other equivalent embodiments without departing from the concept of the present disclosure, and the scope of the present disclosure is determined by the scope of the appended claims.

What is claimed is:

1. A weight precision configuration method, comprising:
determining a pre-trained preset neural network, wherein the preset neural network comprises a plurality of layers each having a preset weight precision, and the preset neural network has an initial recognition rate greater than a target threshold;
reducing, based on a current threshold, the weight precision of at least one layer in the preset neural network to obtain a corrected neural network having a recognition rate greater than the current threshold, wherein the current threshold is less than or equal to the target threshold, and reducing the weight precision of a layer comprises: adjusting the weight precision of the layer; setting, if a termination condition is met, the weight precision of the layer to a corrected weight precision that is less than or equal to the preset weight precision of the layer; and returning, if the termination condition is not met, to the operation of adjusting the weight precision of the layer; and
determining, according to the corrected neural network, a final weight precision of each layer to obtain a final neural network, wherein the final neural network has a recognition rate greater than the target threshold,
wherein reducing the weight precision of at least one layer in the preset neural network comprises:
reducing weight precisions of multiple layers in the preset neural network,
wherein reducing weight precisions of multiple layers in the preset neural network comprises:
selecting a current target layer from candidate layers, wherein each candidate layer is an unlocked layer;
adjusting the weight precision of the current target layer;
setting, if the termination condition is met, the weight precision of the current target layer to the corrected weight precision, locking the current target layer and returning to the operation of selecting a current target layer from the candidate layers; and
returning, if the termination condition is not met, to the operation of adjusting the weight precision of the current target layer,
wherein selecting the current target layer from the candidate layers comprises:
selecting a layer having a highest influence degree on the recognition rate of the neural network from the candidate layers as the current target layer;
or
selecting a layer having a lowest influence degree on the recognition rate of the neural network from the candidate layers as the current target layer,
wherein between determining the pre-trained preset neural network and reducing the weight precision of at least one layer in the preset neural network, the method further comprises:
determining the initial recognition rate of the preset neural network;
respectively reducing, for each layer in the preset neural network, the weight precision of the layer by a same value from the preset weight precision of the layer, and determining a reduction value of a reduced recognition rate of the preset neural network from the initial recognition rate;
determining, according to a relationship of the reduction values of the layers, a relationship of influence degrees of the layers on the recognition rate of the neural network, wherein the greater the reduction value of a layer, the higher the influence degree of the layer on the recognition rate of the neural network.

2. The method according to claim 1, wherein selecting the current target layer from the candidate layers comprises:
selecting a layer with a largest number of weight values from the candidate layers as the current target layer;
or
selecting a layer with a smallest number of weight values from the candidate layers as the current target layer.

3. The method according to claim 1, wherein reducing the weight precision of a layer comprises:
reducing the weight precision of the layer;
returning, if a reduced recognition rate of the preset neural network is greater than the current threshold, to the operation of reducing the weight precision of the layer; and
taking, if the reduced recognition rate of the preset neural network is less than or equal to the current threshold, the weight precision before the reduction as the corrected weight precision of the layer, and setting the weight precision of the layer to the corrected weight precision.

4. The method according to claim 1, wherein reducing the weight precision of a layer comprises:
setting, if the weight precision of the layer is equal to the preset weight precision, the weight precision of the layer to a preset lowest precision;
increasing the weight precision of the layer;
returning, if an increased recognition rate of the preset neural network is less than or equal to the current threshold, the operation of increasing the weight precision of the layer; and
taking, if the increased recognition rate of the preset neural network is greater than the current threshold, the increased weight precision as the corrected weight precision of the layer, and setting the weight precision of the layer to the corrected weight precision.

5. The method according to claim 1, wherein returning, if the termination condition is not met, to the operation of adjusting the weight precision of the layer comprises:
training the preset neural network if the termination condition is not met, and returning to the operation of adjusting the weight precision of the layer,
wherein training the preset neural network comprises:
acquiring the weight precision of a receiving layer in the neural network, wherein the receiving layer is a layer under a sending layer, and the sending layer is any layer except the last layer in the neural network; and
configuring a precision of data to be output from the sending layer according to at least the weight precision of the receiving layer.

6. The method according to claim 1, wherein the current threshold is equal to the target threshold, and
determining, according to the corrected neural network, the final weight precision of each layer comprises:
determining the weight precision of each layer in the corrected neural network as the final weight precision of the layer.

7. The method according to claim 1, wherein the current threshold is less than the target threshold, and
determining, according to the corrected neural network, the final weight precision of each layer comprises:
training the corrected neural network; and determining, according to a relationship between the recognition rate of the trained corrected neural network and the target threshold, the final weight precision of each layer.

8. The method according to claim 7, wherein determining, according to the relationship between the recognition rate of the trained corrected neural network and the target threshold, the final weight precision of each layer comprises:
reducing the current threshold if the recognition rate of the trained corrected neural network is greater than the target threshold, and returning to the operation of reducing the weight precision of at least one layer in the preset neural network; and
determining, if the recognition rate of the trained corrected neural network is less than or equal to the target threshold, the corrected weight precision of each layer in the corrected neural network after a previous training as the final weight precision of the layer.

9. The method according to claim 7, wherein determining, according to the relationship between the recognition rate of the trained corrected neural network and the target threshold, the final weight precision of each layer comprises:
increasing the current threshold if the recognition rate of the trained corrected neural network is less than or equal to the target threshold, and returning to the operation of reducing the weight precision of at least one layer in the preset neural network; and
determining, if the recognition rate of the trained corrected neural network is greater than the target threshold, the corrected weight precision of each layer in the trained corrected neural network as the final weight precision of the layer.

10. The method according to claim 7, wherein training the corrected neural network comprises:
acquiring the weight precision of a receiving layer in the neural network, wherein the receiving layer is a layer under a sending layer, and the sending layer is any layer except the last layer in the neural network; and
configuring a precision of data to be output from the sending layer according to at least the weight precision of the receiving layer.

11. A computer device, comprising at least one processing core configured to, when executing a computer program, implement the method according to claim 1.

12. The computer device according to claim 11, wherein the at least one processing core comprises a plurality of processing cores forming a many-core architecture.

13. A non-transitory computer-readable storage medium, having a computer program stored thereon which, when executed by a processor, causes the method according to claim 1 to be implemented.

14. A weight precision configuration method, comprising:
determining a pre-trained preset neural network, wherein the preset neural network comprises a plurality of layers each having a preset weight precision, and the preset neural network has an initial recognition rate greater than a target threshold;
reducing, based on a current threshold, the weight precision of at least one layer in the preset neural network to obtain a corrected neural network having a recognition rate greater than the current threshold, wherein the current threshold is less than or equal to the target threshold, and reducing the weight precision of a layer comprises:
adjusting the weight precision of the layer; setting, if a termination condition is met, the weight precision of the layer to a corrected weight precision that is less than or equal to the preset weight precision of the layer; and
returning, if the termination condition is not met, to the operation of adjusting the weight precision of the layer; and
determining, according to the corrected neural network, a final weight precision of each layer to obtain a final neural network, wherein the final neural network has a recognition rate greater than the target threshold,
wherein reducing the weight precision of at least one layer in the preset neural network comprises:
reducing weight precisions of multiple layers in the preset neural network,
wherein reducing weight precisions of multiple layers in the preset neural network comprises:
starting a round of adjustment;
selecting a current target layer from candidate layers, wherein each candidate layer is an unlocked layer with a weight precision not adjusted in the current round of adjustment;
adjusting the weight precision of the current target layer;
setting, if the termination condition is met, the weight precision of the current target layer to the corrected weight precision, and locking the current target layer;
returning, if there is still a candidate layer in the current round of adjustment, to the operation of selecting a current target layer from the candidate layers; and
returning, if there is no candidate layer left in the current round of adjustment, to the operation of starting a round of adjustment,
wherein selecting the current target layer from the candidate layers comprises:
selecting a layer having a highest influence degree on the recognition rate of the neural network from the candidate layers as the current target layer;
or
selecting a layer having the a lowest influence degree on the recognition rate of the neural network from the candidate layers as the current target layer,
wherein between determining the pre-trained preset neural network and reducing the weight precision of at least one layer in the preset neural network, the method further comprises:
determining the initial recognition rate of the preset neural network;
respectively reducing, for each layer in the preset neural network, the weight precision of the layer by a same value from the preset weight precision of the layer, and determining a reduction value of a reduced recognition rate of the preset neural network from the initial recognition rate;
determining, according to a relationship of the reduction values of the layers, a relationship of influence degrees of the layers on the recognition rate of the neural network, wherein the greater the reduction value of a layer, the higher the influence degree of the layer on the recognition rate of the neural network.

15. The method according to claim 14, wherein selecting the current target layer from the candidate layers comprises:
selecting a layer with a largest number of weight values from the candidate layers as the current target layer;
or
selecting a layer with a smallest number of weight values from the candidate layers as the current target layer.

16. A computer device, comprising at least one processing core configured to, when executing a computer program, implement the method according to claim 14.

17. The computer device according to claim 16, wherein the at least one processing core comprises a plurality of processing cores forming a many-core architecture.

18. A non-transitory computer-readable storage medium, having a computer program stored thereon which, when executed by a processor, causes the method according to claim 14 to be implemented.

\* \* \* \* \*